UNITED STATES PATENT OFFICE.

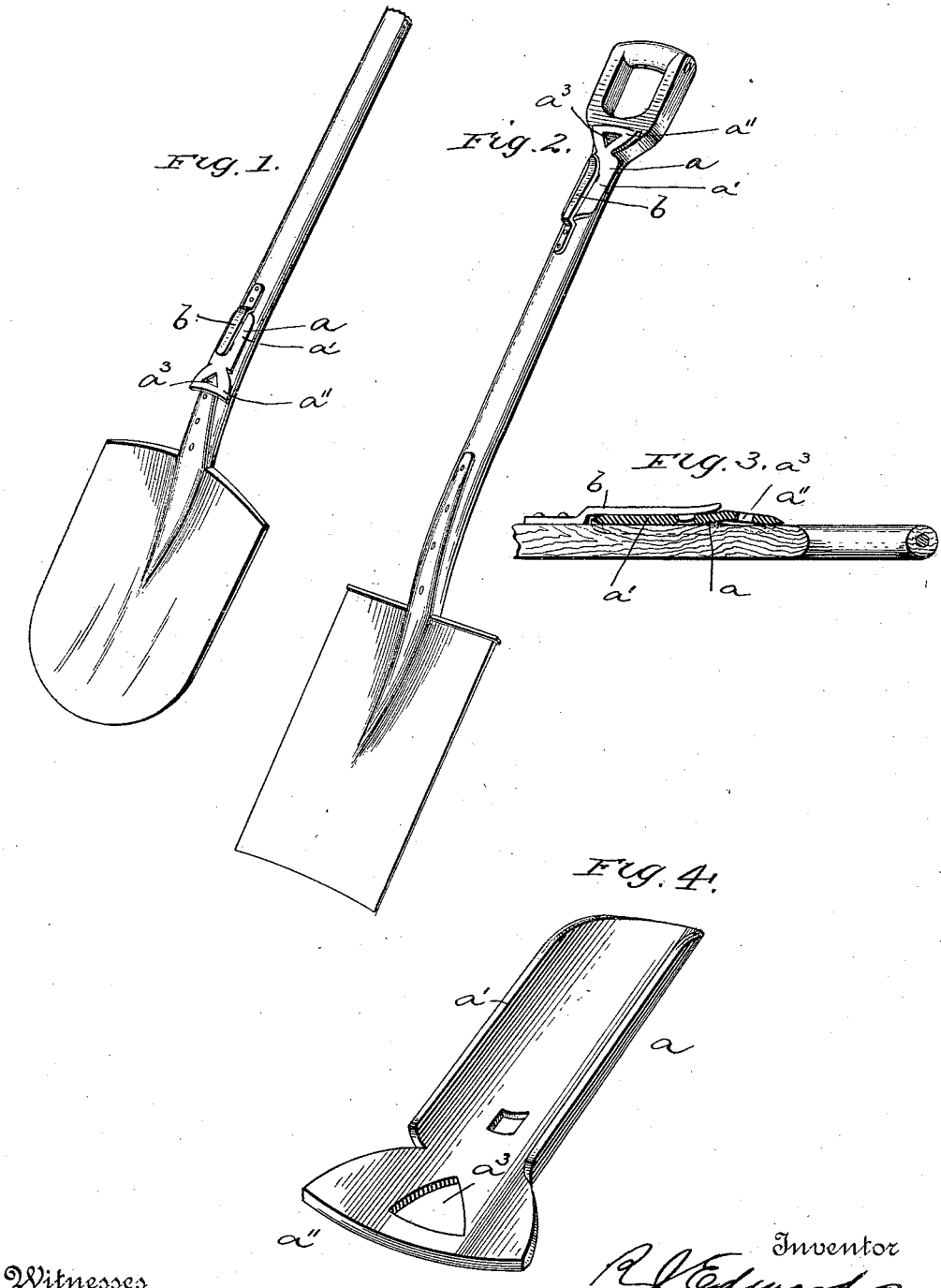

RICHARD J. EDWARDS, OF GALENA, ILLINOIS.

SCRAPER ATTACHMENT FOR SHOVELS.

SPECIFICATION forming part of Letters Patent No. 475,208, dated May 17, 1892.

Application filed January 2, 1892. Serial No. 416,877. (No model.)

*To all whom it may concern:*

Be it known that I, RICHARD J. EDWARDS, a citizen of the United States, residing at Galena, in the county of Jo Daviess and State of Illinois, have invented certain new and useful Improvements in Scraper Attachments to Shovels, Spades, Hoes, and Similar Implements, of which the following is a specification, reference being had therein to the accompanying drawings, in which—

Figure 1 represents a perspective view of a long-handled shovel provided with my improved attachment; Fig. 2, a similar view of a spade; Fig. 3, a detail sectional view of a portion of a spade, and Fig. 4, a detail perspective view of the scraper detached.

The invention has for its object to provide an extremely simple and eminently useful scraper attachment for shovels, spades, hoes, cultivators, plows, &c., which may be readily detached from its fastening or clasp on the implement when it is desired to clean or scrape the blade thereof, and which when attached to the implement will be out of the way, so as not to interfere with the proper use thereof, as will be more fully hereinafter set forth.

In the drawings, $a$ designates the scraper, and $b$ the leaf-spring or clasp detachably securing it to the handle of the implement. When applied to shovels of the long-handled variety, as shown in Fig. 1, the device is preferably secured to the handle thereof near the shovel-blade; but when attached to spades and spade-handle shovels it is preferably attached to the same near the upper ends of their handles, as shown in Fig. 2. If desired, however, the attachment may be secured or applied to any other portion of the handles of the implements without in the least departing from the invention, the only requisite being that the device should not be secured where it will be in the way of the operator, as is evident.

I have shown the device applied to shovels and spades; but it is evident that it may be used on other implements, such as hoes, rakes, cultivators, plows, harrows, and other soil-working devices without departing from the invention.

The handle $a'$ of the scraper is of suitable length and is curved or bent transversely, so as to embrace the handle of the implement, this curvature serving to prevent accidental sidewise displacement of the device when attached to the implement. The forward end $a''$ of the device is preferably wider and flatter than the handle part and has its forward slightly-curved edge sharpened to form the scraper-blade. This edge is sharpened on both sides to more effectively remove the soil adhering to the implement. The scraper-blade is provided with an opening $a^3$, which enables the device to be hung on a nail or peg when removed entirely from the implement. The leaf-spring or clasp is rigidly attached at one of its ends to the handle and has its other end free and slightly curved. The scraper device is secured by having its handle end slipped under the free end of the spring, as shown, the spring being preferably provided near its free end with a lug, which engages a recess in the scraper-handle and thereby prevents accidental displacement and loss of the scraper. When secured to spades and spade-handle shovels, the device is preferably secured in such position on the handle that its flat scraper portion $a''$ lies flat on the upper hand-hold, as shown in Fig. 2. It will be observed that by thus detachably attaching a scraping-tool to this class of implements the tool is always handy and convenient and thereby saves the operators considerable time and trouble, as is evident.

The tool may be detachably attached by other means than the spring without departing from the invention, as I distinctly desire to reserve the right to vary the specific construction of the holding means and the tool.

The curved end of the handle part of the scraper may be sharpened to an edge, if desired, and used as a scraper, this end being particularly advantageous in scraping out such narrow or close places of the implements that the flat part will not reach.

Having thus fully described my invention, what I claim, and desire to secure by Letters Patent, is—

1. The combination of a soil-working implement, a leaf-spring $b$ secured thereon and provided with a lug on its free end, and an independent scraper-plate $a$, detachably clamped to said implement by said spring and provided with an opening for the reception of the lug on the free end of the spring, substantially as described.

2. The combination, with a hand soil-working implement provided with a spade-handle and carrying on its handle a device for detachably holding a hand-scraper, of an independent hand-scraper, detachably secured to the handle by said device, said scraper consisting of a plate bent at one end to embrace the handle of the implement and flattened at its other end to rest on the flat side of the spade-handle, substantially as described.

In testimony whereof I affix my signature in presence of two witnesses.

RICHARD J. EDWARDS.

Witnesses:
JOHN J. JONES,
J. H. HELLMAN.